(12) United States Patent
D'Apuzzo et al.

(10) Patent No.: US 11,125,693 B2
(45) Date of Patent: Sep. 21, 2021

(54) SURFACE ENHANCED INFRARED ABSORPTION STAGE

(71) Applicant: HEWLETT-PACKARD DEVELOPMENT COMPANY, L.P., Spring, TX (US)

(72) Inventors: Fausto D'Apuzzo, Palo Alto, CA (US); Aleksandr Polyakov, Palo Alto, CA (US); Anita Rogacs, Palo Alto, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 515 days.

(21) Appl. No.: 16/076,077

(22) PCT Filed: Jan. 31, 2017

(86) PCT No.: PCT/US2017/015818
§ 371 (c)(1),
(2) Date: Aug. 7, 2018

(87) PCT Pub. No.: WO2018/143935
PCT Pub. Date: Aug. 9, 2018

(65) Prior Publication Data
US 2021/0215611 A1    Jul. 15, 2021

(51) Int. Cl.
*G01N 21/65* (2006.01)
*G01N 21/552* (2014.01)

(52) U.S. Cl.
CPC ......... *G01N 21/658* (2013.01); *G01N 21/554* (2013.01)

(58) Field of Classification Search
CPC ................... G01N 21/658; G01N 21/554
See application file for complete search history.

(56) References Cited

U.S. PATENT DOCUMENTS

| 8,568,878 B2 | 10/2013 | Wilson et al. |
| 2011/0053794 A1 | 3/2011 | Zhang |

(Continued)

FOREIGN PATENT DOCUMENTS

| CN | 102706852 A | 10/2012 |
| CN | 102565024 B | 6/2014 |

(Continued)

OTHER PUBLICATIONS

Adato et al., "Engineering Mid-Infrared Nanoantennas for Surface Enhanced Infrared Absorption Spectroscopy", Materials Today, vol. 18, Issue No. 8, Retrieved from Internet—http://www.sciencedirect.com/science/article/pii/S1369702115000814, 2015, 22 Pages.

(Continued)

*Primary Examiner* — Jamil Ahmed
(74) *Attorney, Agent, or Firm* — Rathe Lindenbaum LLP

(57) ABSTRACT

A surface enhanced infrared absorption stage may include a substrate, a static island extending from the substrate and a movable nano finger extending from the substrate. The static island may have a plasmonically active island cap and a dimension parallel to the substrate of at least one micrometer. The movable nano finger may be aligned with the dimension. The movable nano finger may have a plasmonically active finger cap closable to less than or equal to 5 nm of the island cap.

15 Claims, 3 Drawing Sheets

(56) References Cited

U.S. PATENT DOCUMENTS

| | | | |
|---|---|---|---|
| 2013/0003058 A1 | 1/2013 | Van et al. | |
| 2013/0070241 A1 | 3/2013 | Li | |
| 2013/0177738 A1 | 7/2013 | Mardilovich et al. | |
| 2015/0177151 A1 | 6/2015 | Hu | |
| 2015/0355093 A1 | 12/2015 | Zhou et al. | |
| 2016/0018263 A1 | 1/2016 | Adato et al. | |
| 2016/0363539 A1* | 12/2016 | Barcelo | B82Y 15/00 |
| 2017/0023483 A1 | 1/2017 | Barcelo | |

FOREIGN PATENT DOCUMENTS

| | | |
|---|---|---|
| CN | 103213938 B | 12/2015 |
| CN | 102928381 B | 3/2016 |
| CN | 104969060 B | 3/2017 |
| CN | 104807799 B | 7/2017 |
| JP | 2003035661 A | 2/2003 |
| KR | 20170008045 A | 1/2017 |
| WO | WO-2012128773 A1 | 9/2012 |
| WO | WO-2013162514 A1 | 10/2013 |
| WO | WO-2014126789 A1 | 8/2014 |

OTHER PUBLICATIONS

Hatab et al., "Free-Standing Optical Gold Bowtie Nanoantenna with Variable Gap Size for Enhanced Raman Spectroscopy", Retrieved from Internet—https://pubs.acs.org/doi/abs/10.1021/nl102963g, 2010, Abstract, 2 Pages.

Wei et al., "Hot Spots in Different Metal Nanostructures for Plasmon-Enhanced Raman Spectroscopy", Nanoscale, vol. 5, Abstract, Retrieved from Internet—http://pubs.rsc.org/en/content/articlelanding/2013/nr/c3nr02924g#!divAbstract, 2013, 2 Pages.

Huck, Christian, et al. "Surface-enhanced infrared spectroscopy using nanometer-sized gaps." ACS Nano 8, No. 5 (2014): 4908-4914.

Neubrech, Frank, et al. "Spatial extent of plasmonic enhancement of vibrational signals in the infrared." ACS nano 8, No. 6 (2014): 6250-6258.

* cited by examiner

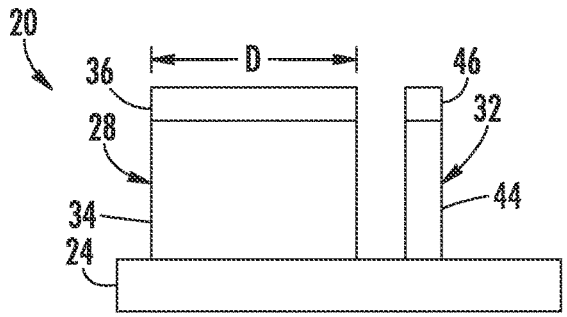

FIG. 1

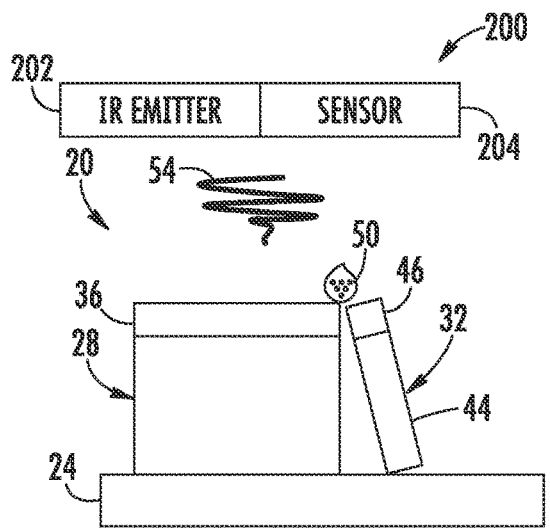

100
- 110: FORM STATIC ISLANDS EXTENDING FROM A SUBSTRATE, EACH OF THE STATIC ISLANDS HAVING A DIMENSION PARALLEL TO THE SUBSTRATE OF AT LEAST ONE MICROMETER, THE STATIC ISLAND HAVING A PLASMONICALLY ACTIVE ISLAND CAP
- 114: FORM MOVABLE NANOFINGERS BEING ALIGNED WITH THE DIMENSION OF ADJACENT STATIC ISLAND, EACH MOVABLE NANOFINGER HAVING A PLASMONICALL ACTIVE FINGER CAP CLOSABLE TO WITHIN 1 NANOMETER OF THE ISLAND CAP OF THE ADJACENT STATIC ISLAND

FIG. 4

300
- 310: APPLY AN ANALYTE TO AN INFRARED ABSORPTION STAGE COMPRISING: A SUBSTRATE; A STATIC ISLAND EXTENDING FROM THE SUBSTRATE HAVING A DIMENSION PARALLEL TO THE SUBSTRATE OF AT LEAST ONE MICROMETER, THE STATIC ISLAND HAVING A PLASMONICALLY ACTIVE ISLAND CAP; AND A MOVABLE NANOFINGER EXTENDING FROM THE SUBSTRATE AND ALIGNED WITH THE DIMENSION, THE MOVABLE NANO FINGER HAVING A PLASMONICALLY ACTIVE FINGER CAP CLOSABLE TO WITHIN 1 NANOMETER OF THE ISLAND CAP
- 314: CLOSE THE FINGER CAP TOWARDS THE ISLAND CAP
- 318: IRRADIATE THE FINGER CAP AND THE ISLAND CAP
- 320: SENSE INFRARED ABSORPTION TO ANALYZE THE ANALYTE

SURFACE ENHANCED INFRARED ABSORPTION STAGE

BACKGROUND

Surface enhanced infrared absorption (SEIRA) is sometimes used for analyzing the structure of an analyte such as inorganic materials and complex organic molecules. SEIRA focuses infrared radiation or light onto the analyte, wherein the interaction between the light and the analyte is detected for analysis.

BRIEF DESCRIPTION OF THE DRAWINGS

FIG. 1 is a side view schematically illustrating a portion of an example SEIRA stage.

FIG. 2 is a flow diagram of an example method for forming an example SEIRA stage.

FIG. 3 is a side view schematically illustrating a portion of an example SEIRA sensing system.

FIG. 4 is a flow diagram of an example method for analyzing and analyte using an example SEIRA sensing system.

Figure 5:
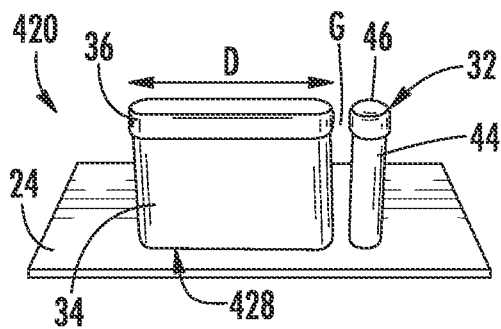
FIG. 5 is a perspective view of a portion of another example SEIRA stage.

Throughout the drawings, identical reference numbers designate similar, but not necessarily identical, elements. The figures are not necessarily to scale, and the size of some parts may be exaggerated to more clearly illustrate the example shown. Moreover the drawings provide examples and/or implementations consistent with the description; however, the description is not limited to the examples and/or implementations provided in the drawings.

DETAILED DESCRIPTION OF EXAMPLES

SEIRA utilizes energy localization gaps between neighboring electrically conductive or metallic surfaces. Reducing the size of the gaps may enhance performance. Disclosed herein are examples of SEIRA stages that offer small, controlled self-limited single digit nanometer gaps for strong energy localization/strong signal strength while at the same time being more economical to fabricate.

The example SEIRA stages comprise flexible nano fingers and wider protruding islands. The islands exhibit a footprint that facilitates operation at infrared wavelengths. The nano fingers are flexible so as to lean towards the islands to create self-limiting nano gaps of less than or equal to 5 nm and as little as 1 to 2 nm, creating hot spots of high optical energy concentration resulting in strong spectroscopic signal response. Because the nano gaps are formed by closure of the nano fingers and the islands, the size of the nano gaps therebetween is not wholly dependent on fabrication density or resolution, facilitating lower cost fabrication techniques.

Disclosed herein is an example SEIRA stage that may comprise a substrate, a static island extending from the substrate and a movable nano finger extending from the substrate. The static island may have a plasmonically active island cap and a dimension parallel to the substrate of at least one micrometer. The movable nano finger may be aligned with the dimension. The movable nano finger may have a plasmonically active finger cap closable to less than or equal to 5 nm of the island cap.

Disclosed herein is an example method for analyzing and analyte using SEIRA. The method may comprise applying an analyte to a SEIRA stage. SEIRA stage may comprise a substrate, a static island extending from the substrate and a movable nano finger extending from the substrate. The static island may have a plasmonically active island cap and a dimension parallel to the substrate of at least one micrometer. The movable nano finger may be aligned with the dimension. The movable nano finger may have a plasmonically active finger cap closable to less than or equal to 5 nm of the island cap. The method may further include closing the finger cap towards the island cap, irradiating the finger cap and the island cap and sensing infrared absorption to analyze the analyte.

Disclosed herein is an example method for forming a SEIRA stage. The method may comprise forming static islands extending from a substrate, each of the static islands having a dimension parallel to the substrate of at least one micrometer, wherein each static island has a plasmonically active island cap. The method may further comprise forming movable nano fingers extending from the substrate, wherein each of the nano fingers is aligned with the dimension of an adjacent static island. Each movable nano finger may have a plasmonically active finger cap closable to less than or equal to 5 nm of the island cap the adjacent static island.

FIG. 1 is a side view of a portion of an example SEIRA stage 20 for use in an SEIRA sensing system, Stage 20 serves as a surface for supporting an analyte and for enhancing interactions between impinging infrared light and the analyte for enhanced sensor sensitivity. Stage 20 utilizes an architecture that may be reliably and cost-effectively fabricated, Stage 20 offers small sized gaps for strong energy localization for enhanced performance. Stage 20 comprises substrate 24, island 28 and nano finger 32.

Substrate 24 comprises a base, foundation or floor for supporting island 28 and nano finger 32. In one implementation, substrate 24 comprises a layer of silicon, quartz, ceramic, glass or a polymeric film such as polyethylene teraphalate (PET). In some implementations, substrate 24 may additionally comprise and interlayer the dielectric material between the silicon substrate and island 28 as well as nano finger 32. Such an interlayer dielectric may form from a material such as $SiO_2$ TEOS, a passivation layer of SiC, silicon nitride, etc. In other implementations, other interlayer dielectric materials may be utilized. In still other implementations, substrate 24 may be formed from other materials.

Island 28 comprises an upstanding structure and projecting from substrate 24 that has a dimension D parallel to substrate 24 of at least one micrometer. Due to its dimensions of at least one micrometer, island 28 may serve as an antenna that operates at infrared wavelengths. Island 28 is substantially static or non-movable relative to nano finger 32.

In the example illustrated, island 28 comprises a base pillar 34 and a plasmonically active island cap 36. Base pillar 34 serves as a stem, supporting cap 36. In one implementation a base pillar 34 is formed from a polymer.

Examples of polymer materials from which each pillar 34 may be formed include, but are not limited to, photo resist, PDMS, or a material selected from the group, which includes both dielectric and non-dielectric materials, consisting of a highly cross-linked uv-curable or thermal-curable polymer, a highly cross-linked uv-curable or thermal-curable plastic, a polysiloxane compound, silicon, silicon dioxide, spin-on glass, a solgel material, silicon nitride, diamond, diamond-like carbon, aluminum oxide, sapphire, zinc oxide, and titanium dioxide.

Cap 36 comprises a plasmonically active or electrically conductive structure formed on top of pillar 34. A plasmonically active structure material is a material that converts radiation, such as light or photons, into plasmons, a density wave in an electron gas. In one implementation, cap 36 comprises a metal material that enhances the intensity of electromagnetic radiation interacting with the analyte in the gap. In one implementation, cap 36 comprises silver, gold, copper, platinum, aluminum, or combinations of these metals in the form of alloys or multilayer systems. In one implementation, cap 36 may comprise a material such as indium tin oxide, aluminum zinc oxide, fluorine doped tin oxide, doped zinc oxides, titanium nitride, carbon nanotubes networks and graphene. In another implementation, cap 36 may comprise other materials that provide such intensity enhancement.

Nano finger 32 comprises an elongated nanometer scale flexible columnar support such as a needle, rod, finger or wire that rises up from substrate 24 proximate to island 36. In one implementation, nano finger 32 has an aspect ratio of and at least 10:1 (a height of at least 10 times the thickness or diameter). In one implementation, such nano finger 32 has a thickness or diameter between 50 nm and 100 nm, while, at the same time, having a height of at least 500 nm and, in one implementation, at least 700 nm. In the example illustrated, nano finger 32 is movable, wherein such columnar structures bend or flex towards island 28 in response to micro-capillary forces or van der Waals forces, wherein such bending facilitates close spacing between the nano finger 32 and island 28 for a smaller gap with enhanced energy localization. In one implementation, pillar 44 rises up from substrate 24 at a location sufficiently close to island 28 such that pillar 44 is bendable or closable to a position in which the tip of nano finger 32 is within 1 nm of island 36.

As schematically shown by FIG. 1, nano finger 32 comprises a pillar 44 supporting a plasmonically active tip or cap 46. In one implementation, pillar 44 comprises an elongate column formed from a polymer material, Pillar 44 serves as a stem supporting cap 46. The polymer material facilitates the use of molding, imprinting or other fabrication techniques to form pillar 44. The polymer material further facilitates bending and flexing of pillar 44 and subsequently closing during use of stage 20. In one implementation, pillar 44 has a diameter of less than a micron. In one implementation of pillar 44 has a diameter of less than or equal to 500 nm. Examples of polymer materials from which each pillar 44 may be formed include, but are not limited to, photo resist, PDMS, or a flexible material selected from the group, which includes both dielectric and non-dielectric materials, consisting of a highly cross-linked uv-curable or thermal-curable polymer, a highly cross-linked uv-curable or thermal-curable plastic, a polysiloxane compound, silicon, silicon dioxide, spin-on glass, a solgel material, silicon nitride, diamond, diamond-like carbon, aluminum oxide, sapphire, zinc oxide, and titanium dioxide.

Cap 46 is similar to cap 36 of island 28. Cap 46 comprises a plasmonically active or electrically conductive structure formed on top of pillar 44. A plasmonically active structure material is a material that converts radiation, such as light or photons, into plasmons, a density wave in an electron gas. In one implementation, cap 46 comprises a metal material that enhances the intensity of electromagnetic radiation interacting with the analyte in the gap. In one implementation, cap 46 comprises silver, gold, copper, platinum, aluminum, or combinations of these metals in the form of alloys or multilayer systems. In one implementation, 36 may comprise a material such as indium tin oxide, aluminum zinc oxide, fluorine doped tin oxide, doped zinc oxides, titanium nitride, carbon nanotubes networks and graphene. In another implementation, nano finger cap 46 may comprise other materials that provide such intensity enhancement. In the example illustrated, pillar 44 rises up from substrate 24 at a location sufficiently close to island 28 such that pillar 44 is bendable or closable to a position in which the nano finger cap 46 less than or equal to 5 nm of island cap 36. In some implementations, pillar 44 is bendable or closable to a position in which the nano finger cap 46 is spaced less than or equal to 2 nm from island cap 36.

FIG. 2 is a flow diagram of an example method 100 that may be used to form a SEIRA stage having small gaps for strong energy localization and enhanced performance. Although method 100 is described with respect to forming a SEIRA state such as stage 20, method 100 may be utilized to form any of the SEIRA stages disclosed herein or similar SEIRA stages. As indicated by block 110, static islands extending from a substrate are formed. The static islands each have a dimension D parallel to the substrate of at least one micrometer. Each static island has a plasmonically active or electrically conductive island cap 36.

In one implementation, each static island 28 has an elongated cross sectional shape such as an elongated oval or a rectangle, the major dimension or length of the elongated oval or rectangle being at least one micrometer. In one implementation, each static island 28 is triangular, having a length or height of at least one micrometer. In yet another implementation, the static island 28 is circular, having a diameter of at least one micrometer. In yet other implementations, the static island 28 may have other cross-sectional shapes having a dimension of at least one micrometer.

As indicated by block 114, movable nano fingers are formed on the substrate in alignment with the dimension of an adjacent static island. The phrase "in alignment with the dimension of an adjacent static island" means that an imaginary line extending along the dimension of the island that is at least one micrometer intersects the nano finger. Each of the formed nano fingers has a plasmonically active finger cap that is closable to lessen or equal to 5 nm of the island cap 36 of the adjacent static island 28. In one implementation, each of the formed nano fingers has a plasmonically active finger cap that is closable to less than or equal to 2 nm of the island cap 36 of the adjacent static island 28. In other words, the nano fingers are formed from a material and dimensioned so as to be bendable or flexible such that the cap of the nano finger may move towards the island to provide a gap of less than or equal to 5 nm or less than or equal to 2 nm between the tips or caps of the islands 28 and the nano fingers 32.

In one implementation, islands 28 and nano fingers 32 are formed on substrate 24 using nano imprint lithography. With nano imprint lithography, a layer of moldable material, such as a UV resist, on substrate 24 is imprinted or embossed with an imprint master, such as a quartz master, wherein ultraviolet light is applied to solidify or cure the patterned UV resist. Sacrifice or withdraw of the imprint master leaves the remaining substrate and formed pillars 34, 44 up standing from the substrate 24. The pillars are then topped with the caps 36, 46.

FIG. 3 is a schematic diagram of a portion of an example SEIRA sensing system 200 comprising stage 20. In addition to stage 20, sensing system 200 comprises infrared emitter 202 and infrared sensor 204. Emitter 202 and sensor 204 interrogate analyte molecules at a frequency resonant to those of molecular vibrations. Emitter 202 comprises a device that emits and directs infrared (wavelength 3-30 microns) or near infrared (wavelength 0.7-3 microns) radiation towards stage 20, towards island 28 and nano finger 32. Infrared sources may include, but are not limited to, thermal sources such as Globar filaments, infrared LEDs and infrared lasers sources. Infrared sensor 204 comprise a device that senses the infrared radiation absorbed by the analyte molecules such as by sensing the quantity of the emitted infrared radiation that is transmitted or reflected back towards sensor 204. Infrared sensors may include Mercurium-Cadmium-Telluride sensors, microbolometers, Indium gallium arsenide, indium antimonide other pyroelectric and imaging arrays of such sensing elements. The amount of energy absorbed by a molecule may serve as a fingerprint facilitating identification of the analyte molecules or to identify characteristics of the analyte molecules.

FIG. 4 is a flow diagram of an example method 300 for analyzing an analyte using SEIRA, Method 300 is described as carried out using system 200 and is illustrated in FIG. 3. It should be appreciated that method 300 may be carried out using other SEIRA sensing systems or other SEIRA stages similar to stage 20.

As indicated by block 310 and illustrated in FIG. 3, an analyte 50 is applied to an SEIRA stage, such as stage 20. As described above, the stage comprises a substrate 24, a static island 28 and a movable nano finger 32. The static island 28 extends from the substrate 24 and has a dimension D parallel to the substrate of at least one micrometer and a plasmonically active/electrically conductive island cap 36, The movable nano finger 32 extends from the substrate and is aligned with the dimension D. The movable nano finger 32 has a plasmonically active or electrically conductive finger cap 46 and is closable to less than or equal to 5 nm of the island cap 36. In one implementation, cap 46 is bendable or closable to less than or equal to 2 nm of the island cap 36.

As indicated by block 314 and further shown in FIG. 3, the finger cap 46 is closed with respect to or towards the island cap 36. In one implementation, the analyte 50 is applied as part of a liquid, wherein liquid is evaporated, leaving the analyte deposited upon island cap 36 and finger cap 46, captured between or within the gap separating island cap 36 and finger cap 46. The evaporation of the liquid creates capillary forces sufficient to draw and bend nano finger 32 towards island 28. In one implementation, the evaporation of the liquid is accelerated through the application of heat to stage 20.

In other implementations, the closing of the island cap 36 and the finger cap 46 may be facilitated in other fashions. For example, in other implementations, nano finger 32 may be heated to a temperature approaching or above its glass transition temperature, causing nano finger 32 to collapse and bend towards island 28. The larger size and mass of island 28 may slow the rate at which the temperature of island 28 rises such that nano finger 32 collapses towards island 28.

As indicated by block 318 and illustrated in FIG. 3, IR emitter 202 irradiates stage 20, impinging the analyte 50, island cap 36 and finger cap 46 with infrared or near infrared radiation 54. As indicated by block 320, sensor 204 senses infrared radiation absorption by the molecules 50. In one implementation, sensor 204 determines the amount of infrared radiation that has been absorbed based upon the quantity of infrared radiation directed at stage 20 and by sensing the quantity of infrared radiation not absorbed, transmitted or reflected back towards sensor 204. The quantity of infrared radiation absorbed by analyte 50 (or not absorbed by analyte 50) may be utilized to analyze the analyte 50, indicating an identity of the analyte 50 or indicating characteristics of the analyte 50.

Figure 6:
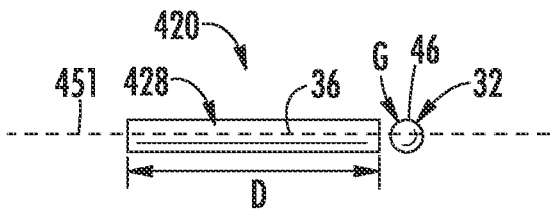
FIG. 6 is a top view of the example SEIRA stage of FIG. 5.

FIGS. 5 and 6 illustrate SEIRA stage 420, an example implementation of SEIRA stage 20. SEIRA stage 420 may be utilized as part of sensing system 200 in place of stage 20. Stage 420 is similar to stage 20 described above except that stage 420 is specifically illustrated as comprising a static island 428 in view of island 28. Those remaining components of stage 420 which correspond to components of stage 20 are numbered similarly.

Static island 428 is similar to island 28 except that static island 428 is specifically illustrated as having an elongate rectangular or rod cross sectional shape having a major dimension D of at least 1 µm. Similar to island 28, static island 428 comprise a stem or base pillar 34 and a static island cap 36. The major dimension C of static island 428 is aligned with nano finger 28. In other words, an imaginary linear line 451 extending along dimension D, through or upon the top of cap 36, intersects cap 46 of nano finger 32.

As with static island 28, because the dimension D that is aligned with nano finger 28 is at least 1 µm, static island 428 serves as an antenna that operates at infrared wavelengths. As with stage 20, nano finger 32 has an elongated aspect ratio facilitating bending of nano finger 32 towards island 36, namely towards the end of the elongated rectangle, so as to close caps 36 and 46 to less than or equal to 5 nm, and in one implementation less than or equal to 2 nm, of one another. This single-digit nanometer scale gap G, after closure or bending, provides a hotspot of high optical energy concentration which results in strong spectroscopic signal response.

Figure 7:
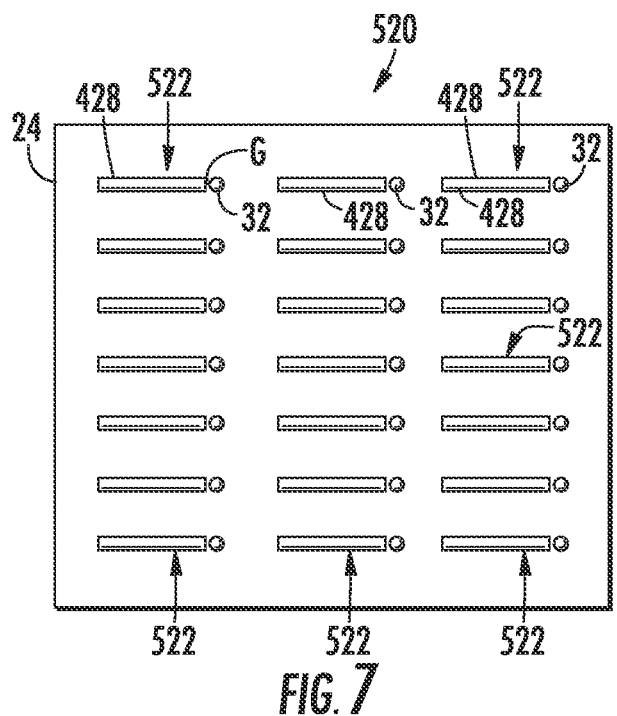
FIG. 7 is a top view of a portion of another example SEIRA stage.

FIG. 7 is a top view of an example SEIRA stage 520 fabricated using nano imprint lithography. In other implementations, stage 520 may be formed using other techniques. Stage 520 comprises a grid or array of island-nano finger pairs 522, each pair 522 comprising a static island 428 and an associated nano finger 32 as described above. Each pair 522 provides a self-limited single-digit nanometer sized gap, upon closure of the caps 36, 46, to provide multiple hotspots of high optical energy concentration which result in strong spectroscopic signal response.

Figure 8:
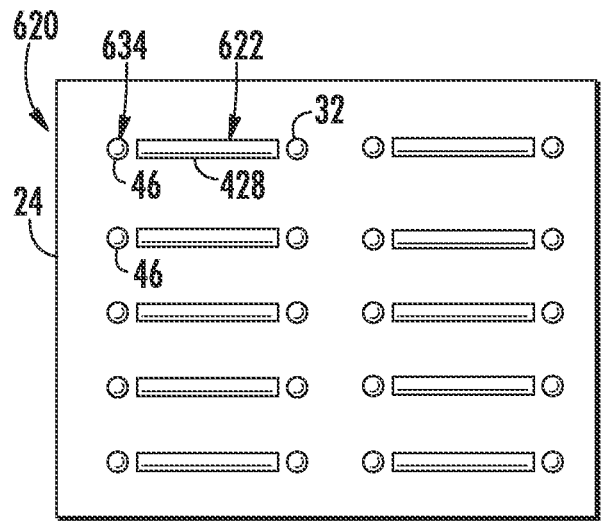
FIG. 8 is a top view of a portion of another example SEIRA stage.

FIG. 8 is a top view of a portion of another example SEIRA stage 620 that may be fabricated using nano imprint lithography. In other implementations, stage 620 may be formed using other techniques. Stage 620 may be utilized as part of SEIRA sensing system 200 described above in place of stage 20. Stage 620 is similar to stage 520 described above except that stage 620 comprises a grid or array of island-nano finger pairs 622 in place of pairs 522. Pairs 622 are similar to pairs 522 except that each pair 622 additionally comprises a second movable nano finger 634 on an opposite and of island 428 as nano finger 34. Nano finger 634 is similar to nano finger 34 in that nano finger 34 comprises a pillar 44 (shown in FIG. 5) that supports a cap 46. As with nano finger 34, the major dimension D of static island 428 is aligned with nano finger 634.

Like nano finger 34, nano finger 634 is bendable or closable with respect to island 428. The cap 46 of nano finger 634 is closable to within 1 nm of cap 36 of island 428. Unlike pairs 522, pairs 622 of stage 620 each provide two self-limited single-digit nanometer sized gaps, upon closure of the caps 36, 46, to provide multiple hotspots of high optical energy concentration which result in strong spectroscopic signal response.

Figure 9:
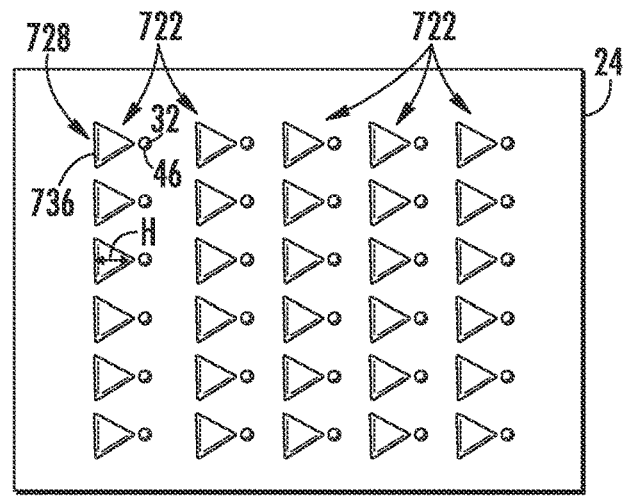
FIG. 9 is a top view of portion of another example SEIRA stage.

FIG. 9 is a top view of a portion of another example SEIRA stage 720 that may be fabricated using nano imprint lithography. In other implementations; stage 720 may be formed using other techniques. Stage 720 is similar to stage 520 described above except that stage 720 comprises a grid or array of island-nano finger pairs 722 in place of pairs 522. Pairs 722 are similar to pairs 522 except that each of pairs 722 comprises a triangular shaped island 728 paired with a movable nano finger 32 (described above).

Island 728 each have an underlying base pillar that supports a plasmonically active cap 736. As shown by FIG. 9, the underlying base pillar and the cap 736 each have a triangular cross sectional shape. The underlying base pillar has a size and shape corresponding to the size and shape of the cap 736 seen in the top view shown in FIG. 9. Each of the triangular islands has a height dimension H (the dimension from the base to the apex of the triangle opposite nano finger 32) of at least one micrometer. The triangular shape of island 728 serves as an infrared antenna which is more broadband, facilitating use of a wider range of wavelengths of radiation in the infrared spectrum when performing SEIRA analysis.

The apex of the triangular shape of each island 728 points to and extends opposite to the paired movable nano finger 32. As in the above described stages, each pair 722 provides a self-limited single-digit nanometer sized gap, upon closure of the caps 736, 46, to provide a hotspot of high optical energy concentration which results in a strong spectroscopic signal response. Although each of the pairs 722 are illustrated as having the same orientation, in other implementations, such pairs 722 may have opposite orientations or may have a variety of different orientations on substrate 24.

Figure 10:
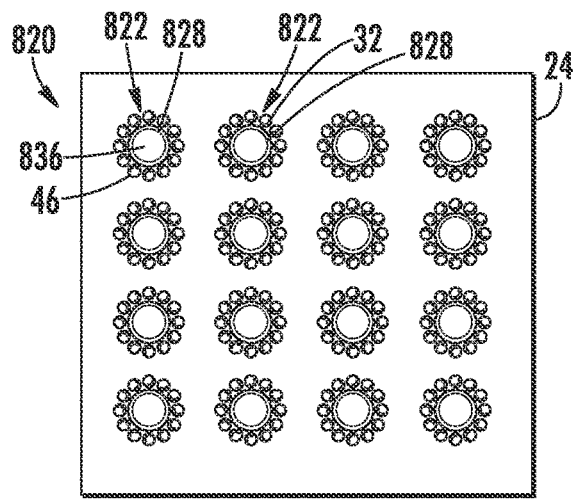
FIG. 10 is a top view of a portion of another example SEIRA stage.

FIG. 10 is a top view of a portion of another example SEIRA stage 820 that may be fabricated using nano imprint lithography. In other implementations, stage 820 may be formed using other techniques. Stage 820 is similar to stage 520 described above except that stage 820 comprises a grid or array of island-nano finger clusters 822 in place of pairs 522. Clusters 822 each comprise a static cylindrical center island 828 surrounded by or encircled by multiple spaced movable nano fingers 32 (described above).

Each of islands 828 has a cylindrical underlying base pillar that supports a plasmonically active cap 836. As shown by FIG. 10, the underlying base pillar and the cap 736 each have a circular cross sectional shape. The underlying base pillar has a size and shape corresponding to the size and shape of the cap 836 seen in the top view shown in FIG. 10. Each of the cylindrical islands has a cap 836 with a diameter at least one micrometer.

During closure and movement of the nano fingers 32, nano fingers 32 bend or flex inwardly towards the center of their associated center island 828. During such closure, caps 46 of nano fingers 32 close to within 1 nm of the cap 836 of island 828. Each cluster 822 provides a multitude of self-limited single-digit nanometer sized gaps corresponding to the number of nano fingers 32 surrounding island 828, upon closure of the caps 836, 46, to provide a multitude of hotspots of high optical energy concentration which results in a strong spectroscopic signal response. Although each of the clusters 822 are illustrated as comprising a same number of nano fingers 32 and as specifically comprising 12 nano fingers 32 about each island 828, in other implementations, clusters 822 may have a different total number of nano fingers 32 about each island 828, Moreover, in some implementations, different clusters may have different numbers of nano fingers 832 about the respective islands 828.

Figure 11:
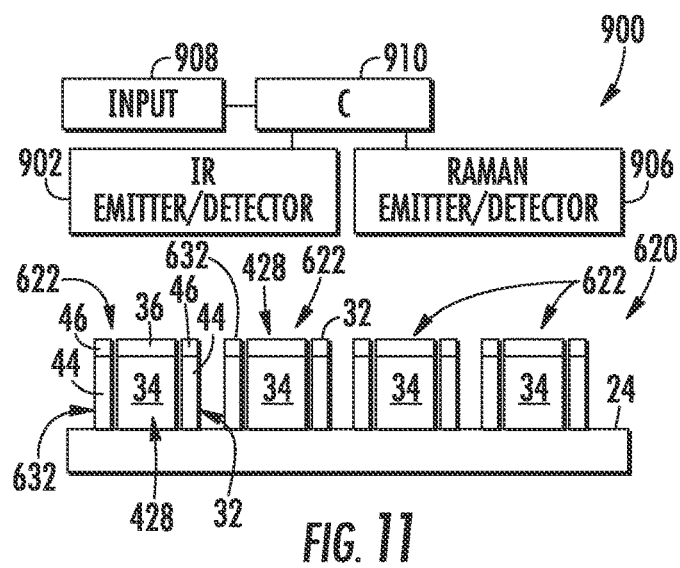
FIG. 11 is a side view schematically illustrating a portion of an example SEIRA/surface enhanced Raman spectroscopy (SERS) sensing system.

In addition to providing a multitude of hotspots equal to the number of nano fingers 32 about the island 828, the dot-flower arrangement of each cluster 822 further provides polarization insensitivity. In other words, clusters 822 may provide high degrees of SEIRA sensitivity when unpolarized infrared or near-infrared light is being used to illuminate, interrogate or irradiate the analyte captured and retained on each cluster 822. In other instances, the center island may have an oval cross-section instead of circular to allow controlled polarization-selective antenna responses, FIG. 11 is a diagram schematically illustrating another example sensing system 900. Sensing system 900 offers greater versatility in that sensing system 900 facilitates both surface enhanced SEIRA analysis and surface enhanced Raman spectroscopy analysis of an analyte. In addition to being able to carry out both Raman spectroscopy and SEIRA analysis, system 900 may apply both types of analysis to a same analyte on a same stage.

Sensing system 900 comprises stage 620, infrared emitter/detector 902, Raman emitter/detector 906, input 908 and controller 910. Stage 620 is described above. It should be appreciated that system 900 may be utilized with any of the stages described above as well as other similar stages having a static island have a plasmonically active cap with a dimension parallel to the substrate of at least one micrometer and a movable nano finger aligned with the dimensions of the cap, wherein the nano finger has a plasmonically active cap closable to a spacing of less than or equal to 5 nm from the island cap.

Infrared emitter/detector 902 comprises IR emitter 202 and sensor 204 described above with respect to system 200. Infrared emitter/detector 902 interrogates analyte molecules at a frequency at which there are molecular vibrations without shifting the frequency of such molecules. Infrared emitter/detector 902 comprises a device that emits and directs infrared or near infrared radiation towards stage 620, towards island 428 and nano fingers 32, 632. Infrared emitter/detector 902 further comprises a device that senses the infrared radiation absorbed by the analyte molecules such as by sensing the quantity of infrared radiation that is reflected back or transmitted towards the infrared emitter/detector 902. The amount of energy absorbed by a molecule may serve as a fingerprint facilitating identification of the analyte molecules or to identify characteristics of the analyte molecules.

Raman emitter/detector 906 comprises a device that directs light, such as a laser beam of light, towards and onto stage 620 and a device that focuses, gathers and detects and SERS spectra resulting from light scattering by the sample analyte on island 428 and nano fingers 32, 632. In one implementation, emitter/detector 906 comprises an infrared laser to emit a beam having a wavelength of 785 nm onto island 428 and nano fingers 32, 632. To direct the beam of light and focus the SERS spectra, resulting from scattering of the light by the island 428 and nano fingers 32, 632, onto a sensing panel, Raman emitter/detector 906 may include one or more optical components such as lenses and mirrors. The received SERS spectra, including shifts in the frequency of light, is compared against previous identified spectrum fingerprints or signatures to identify characteristics of the sample analyte.

Input 908 comprise a device by which selections or commands may be provided to controller 910 indicating whether system 900 is to operate in either an SEIRA detection mode or a Raman spectroscopy detection mode. Input 908 may comprise a touch screen, a mouse, a keyboard, a touchpad, a microphone with speech recognition and the like. In some implementations, input 908 may comprise a pushbutton, toggle switch or other manual input device.

Controller 910 comprises electronic hardware, such as a processing unit, to carry out instructions contained in a non-transitory computer-readable medium or memory. Controller 910 selectively activates emitter/detector 902 or emitter/detector 906 in response to instructions received via the input 908. Because stage 620 (or any of the other stages described above, comprises at least one nano finger 32 that is bendable or closable towards and associated island 20, 428, 728, 828, stage 620 is well-suited for serving as an analyte supporting surface that facilitate surface enhanced Raman spectroscopy. As a result, through appropriate input to controller 910, system 900 may be used to first identify one or more characteristics of an analyte using SEIRA and then to either confirm the results or to identify additional characteristics of the analyte using surface enhanced Raman spectroscopy (SERS).

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements.

The invention claimed is:

1. A sensing apparatus comprising:
   surface enhanced infrared absorption stage comprising
      a substrate;
      a static island extending from the substrate having a dimension parallel to the substrate of at least one micrometer, the static island having a plasmonically active island cap; and
      a movable nano finger extending from the substrate and aligned with the dimension, the movable nano finger having a plasmonically active finger cap closable to less than or equal to 5 nm of the island cap.

2. The sensing apparatus of claim 1, wherein the island cap and the finger cap are each formed from a metal selected from a group of metals consisting of gold and silver.

3. The sensing apparatus of claim 1, wherein the island cap and the finger cap are each formed from a material selected from indium tin oxide, aluminum zinc oxide, fluorine doped tin oxide, doped zinc oxides, titanium nitride, carbon nanotubes networks and graphene.

4. The sensing apparatus of claim 1, wherein the dimension comprise
   a length of the island, the island having a width less than the length,
   wherein the movable nano finger is at an end of the length.

5. The sensing apparatus of claim 4, further comprising a second movable nano finger extending from the substrate at a second end of the length.

6. The sensing apparatus of claim 1, wherein the static island comprises has a triangular cross sectional shape and wherein the movable nano finger is at a point of the triangular cross sectional shape.

7. The sensing apparatus of claim 1, wherein the static island comprises a cylindrical rod and wherein the sensing apparatus further comprises a plurality of second movable nano fingers encircling a perimeter of the cylindrical rod, each of the second movable nano fingers having a plasmonically active finger cap being closable to within a nanometer of the island cap.

8. The sensing apparatus of claim 1, and the static island has an oval cross sectional shape and wherein the sensing apparatus further comprises a plurality of second movable nano fingers encircling a perimeter of the oval cross sectional shape, each of the second movable nano fingers having a plasmonically active finger cap being closable to within a nanometer of the island cap.

9. The sensing apparatus of claim 1 comprising:
   a Raman spectroscopy stimulus source-sensor;
   a surface enhanced infrared absorption (SEIRA) stimulus source-sensor; and
   a controller to selectively activate one of the Raman spectroscopy stimulus source-sensor and the SEIRA stimulus source-sensor to irradiate the island cap and the finger cap with stimulus and sense interactions of the stimulus with analyte.

10. The sensing apparatus of claim 1 comprising an array of island-finger pairs extending from the substrate, each island-finger pair comprising the static island and the movable nano finger.

11. A method comprising:
   applying an analyte to a surface enhanced infrared absorption (SEIRA) stage comprising:
      a substrate;
      a static island extending from the substrate having a dimension parallel to the substrate of at least one micrometer, the static island having a plasmonically active island cap; and
      a movable nano finger extending from the substrate and aligned with the dimension, the movable nano finger having a plasmonically active finger cap closable to less than or equal to 5 nm of the island cap; and
   closing the finger cap towards the island cap;
   irradiating the finger cap and the island cap; and
   sensing infrared absorption to analyze the analyte.

12. The method of claim 11 further comprising sensing Raman scattering from the enhancing surface to analyze the analyte.

13. The method of claim 11, wherein the finger cap and the island cap are formed from material selected from a group of materials consisting of indium tin oxide, aluminum zinc oxide, fluorine doped tin oxide, doped zinc oxides, titanium nitride, carbon nanotubes networks and graphene.

14. A method for forming a surface enhanced infrared absorption stage comprising:
   forming static islands extending from a substrate, each of the static islands having a dimension parallel to the substrate of at least one micrometer, the static island having a plasmonically active island cap; and
   forming movable nano fingers extending from the substrate, each of the nano fingers being aligned with the dimension of an adjacent static island, each movable nano finger having a plasmonically active finger cap closable to less than or equal to 5 nm of the island cap the adjacent static island.

15. The method of claim 14, wherein forming the static islands and forming the nano fingers comprises:
   imprinting a polymer to form the static islands and movable nano fingers; and
   coating and portions of each of the static islands and movable nano fingers with a plasmonically active material to form the island caps and the finger caps.

* * * * *